United States Patent
Sassin

[15] 3,693,648
[45] Sept. 26, 1972

[54] DUCT SYSTEM FOR LOW-TEMPERATURE FLUIDS AND THERMALLY ISOLATED ELECTRICAL CONDUCTORS

[72] Inventor: Wolfgang Sassin, Julich, Germany

[73] Assignee: Kernforschungsoulage Julich Gesellschaft mit beschrankter Haftung, Julich, Germany

[22] Filed: May 4, 1970

[21] Appl. No.: 34,082

[30] Foreign Application Priority Data

May 2, 1969  Germany..........P 19 22 487.4

[52] U.S. Cl. ................137/375, 156/54, 156/195, 174/15 C, 138/113, 138/114, 138/154
[51] Int. Cl. .............................................F16l 7/00
[58] Field of Search .137/375; 165/136, 156; 156/54, 156/55, 56, 187, 188, 190, 195; 138/113, 114, 148, 154; 174/15 C

[56] References Cited

UNITED STATES PATENTS

| | | |
|---|---|---|
| 3,512,581 | 5/1970 | Lawton....................174/15 X |
| 3,146,005 | 8/1964 | Peyton....................138/148 X |
| 3,207,533 | 9/1965 | Van Gundy et al....138/114 X |
| 3,270,769 | 9/1966 | Kaiser et al................137/375 |
| 3,250,297 | 5/1966 | Mooneyham..............138/113 |
| 3,292,016 | 12/1966 | Kafka.......................174/15 X |
| 3,349,168 | 10/1967 | Rehder et al. .........138/113 X |
| 3,485,237 | 12/1969 | Bedford....................138/154 |

Primary Examiner—Henry T. Klinksiek
Attorney—Karl F. Ross

[57] ABSTRACT

A duct system for low-temperature fluids, especially low-boiling-point gases such as helium, and for thermally isolated electrical conductors wherein an evacuated outer rigid conduit surrounds the fluid-carrying duct which consists of a foil flexible and nonsupporting at room temperature but reinforced by a helical strip. The foil preferably consists of polyethyleneterephthalate.

6 Claims, 5 Drawing Figures

Wolfgang Sassin
INVENTOR.

BY
Karl F. Ross
ATTORNEY

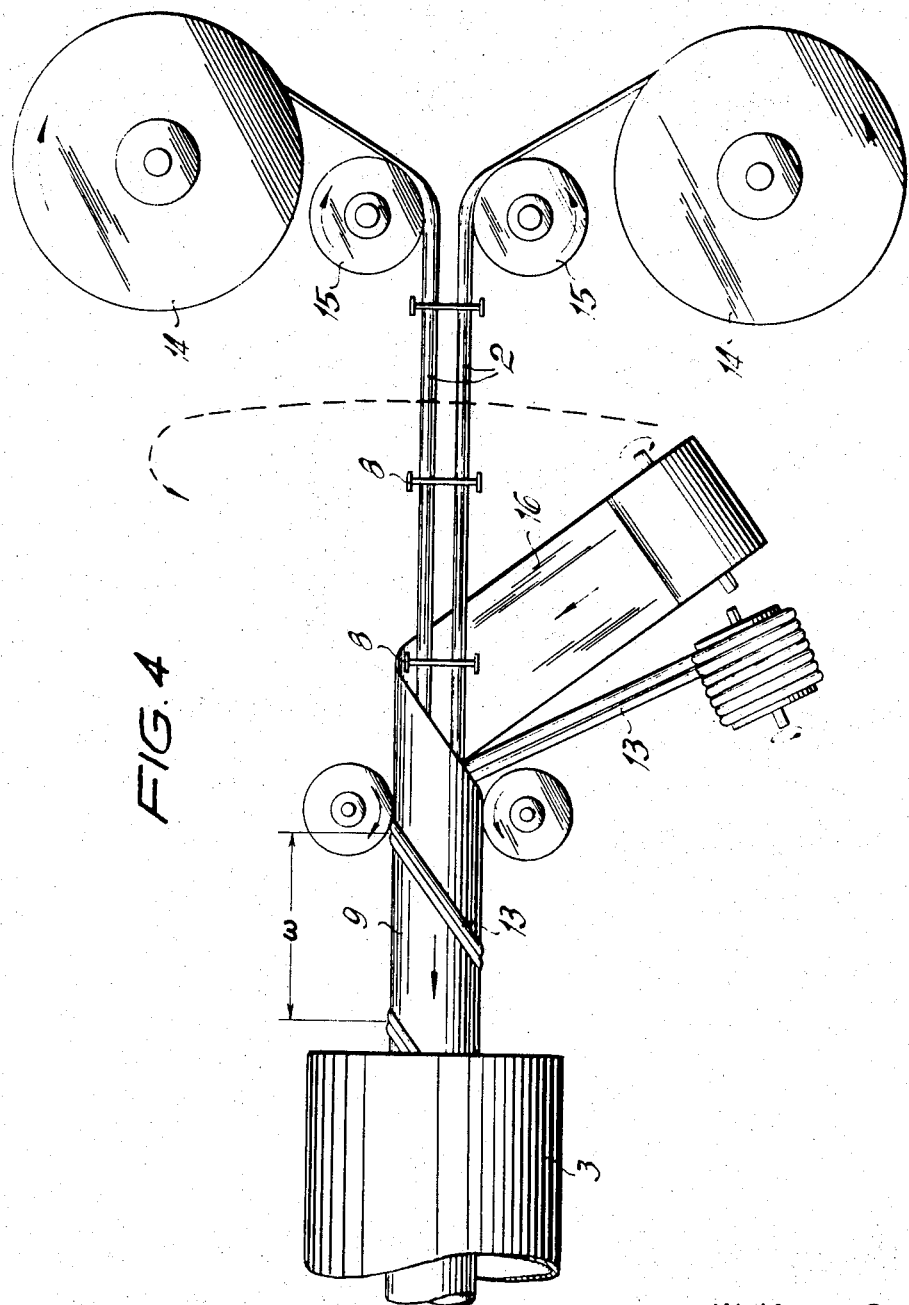

3,693,648

DUCT SYSTEM FOR LOW-TEMPERATURE FLUIDS AND THERMALLY ISOLATED ELECTRICAL CONDUCTORS

FIELD OF THE INVENTION

My present invention relates to a duct system for the long-distance transport of low-temperature fluids, especially low-boiling-point gases, e.g. helium, adapted to be displaced in a liquid or gaseous state, and to thermally isolated conduits for electric wires or cables adapted to operate in superconductive regions or at the temperatures of such low-boiling-point gases; more particularly, the invention relates to thermally isolated duct systems adapted to traverse long distances with minimum heat leakage into the system.

CROSS-REFERENCE TO COPENDING APPLICATION

In my copending application, Ser. No. 887,654, filed Dec. 23, 1969, now U.S. Pat. No. 3,602,638, entitled PIPE SYSTEM FOR LOW-TEMPERATURE FLUIDS, I have described and claimed an arrangement for preventing heat leakage into a fluid-carrying conduit.

In that application, I have pointed out that in cryogenic systems and systems requiring the cooling of electrical conductors, low-temperature fluids must be displaced, transported or circulated with a minimum "loss of cold" or gain of heat; for example, for liquefied gases, it had been proposed theretofore to provide a conduit system in which an inner fluid-carrying duct or pipe was surrounded by an outer shell or tube spaced from the inner pipe by an annular clearance which was evacuated to limit convective transfer of heat between the outer wall or casing and the inner fluid-carrying duct. To further prevent the transfer of heat and increase the effective insulating quality of the system, radiation-limiting shields could surround the inner pipe, thereby restricting radiation transfer of thermal energy.

BACKGROUND OF THE INVENTION

Prior to the development described above, it had been the practice with respect to insulated ducts for preventing heat leakage to a low-temperature fluid or conductor, to surround the inner tube (carrying the electric line and/or a lower-temperature fluid) with the aforementioned highly evacuated shell. Typical fluids include low-boiling-point gases such as helium at a temperature in the vicinity of its critical point. It has been found to be a problem, especially with liquid helium and systems using low-boiling-point gases which must be transported between a source of the low-temperature fluid and a consumer thereof and systems using such fluids for the cooling of electrical conductors, that heat leakage is pronounced and may severely limit the operational lengths of the duct arrangements.

Thus, the upper limit of the length of a prior art duct system for the indicated purposes has been 10 to 100 meters depending upon the complexity of the arrangement, whereas industry often has desired the transport of such low-boiling-point fluids over much larger distances ranging to several hundred kilometers.

OBJECT OF THE INVENTION

It is the principal object of the present invention to provide an improved duct system for conveying cold media in gaseous and/or liquid form with a minimum of heat leakage into the system, negligible impediment to fluid flow, and high insulating efficiency, without the drawbacks of earlier systems as noted above.

It is also an object of the present invention to provide an insulated duct system comprising one or more substantially continuous ducts extending over the length of the duct system. Another object of the invention is to provide an insulated duct system for conveying cold media, the ducts being made of material which at room temperature has no appreciable stability of shape. Yet another object of the invention is the provision of an insulating duct adapted to carry electrical conductors cooled by low-temperature media.

It is, moreover, an object of the invention to provide an insulated duct system for the purposes described adapted to extend over distances of up to several hundred kilometers, which is easily manufactured and is constituted of relatively low-cost materials.

SUMMARY OF THE INVENTION

The above and other objects are attained, in accordance with the present invention, with a simplified duct system conveying low-temperature fluids and capable of spanning distances of up to several hundred kilometers with high thermal efficiency, the system comprising an inner conduit traversed by low-temperature fluid and, where necessary, receiving the electrical conductors and formed internally seamlessly of a non-supporting (at room temperature) material.

According to the present invention, therefore, the low-temperature-fluid conduit is composed of a foil, the foil being non-selfsupporting in a warm state (e.g. at room temperature) although at the low temperature of the fluid it may rigidify. Advantageously, this flexible material has a wall thickness sufficiently small as to possess practically no noticeable self-supporting qualities and is received within an inner envelope or shell in the form of an intermediate tube held with clearance away from the fluid-carrying conduit by spacers longitudinally offset along the tubes, the intermediate tube being evacuated or otherwise held at a pressure below that within the fluid-carrying duct.

The spacers of the present invention may also serve to hold apart two or more fluid-carrying ducts which may be additionally traversed by electrical conductors which are to be cooled by the fluid or operated in a superconductive state. The spacer arrangement has been found to be particularly effective with electrical-conductor arrangements since the spacers also serve to resist the magnetic fields surrounding the high-energy conductors and the forces of which tend to draw the conductors together.

According to a more specific feature of this invention, the fluid-carrying duct is composed of a polyethyleneterephthalate (polyester) foil, such as is marketed under the name "MYLAR" and is nonelastic, i.e. is composed of a foil of a thickness (for example between 0.1 mm and 1 mm) such that the tube is flattenable in the manner of a fabric fire hose and can be wound upon large-diameter drums and thus delivered to the site of conduit assembly. The tube can be formed (laminated) from a plurality of layers of foil (each of a thickness of about 0.1 mm) whereby, in accordance with the principles of the present invention, the adhesive between the several layers is a two-component epoxy adhesive such as that marketed under the trade designations HYSOL 2038 KR, or 3466 H. The resulting tube is effective at temperatures below 80° K, and has been found to be capable of maintaining pressure at such low temperatures without significant leakage, and even with superfluid helium.

The laminated tubes of this invention have the additional advantage that the amount of cooling necessary to reduce the temperature of the tube itself is minimal by comparison with metal-tube systems. This results not only from the fact that the mass is substantially reduced by substitution of synthetic resin as the tube material, but also from the fact that the tubes are substantially thinner than heretofore. The heat capacity of the synthetic resin is therefore negligible. The laminated tubes also permit the insulation sheath heretofore surrounding the electric conductor to be eliminated, thereby increasing the heat-transfer efficiency at the surface of the conductor without increasing the danger of short-circuiting.

The inner envelope or shell is, according to the present invention, also cooled to a low temperature and preferably comprises a helically-wound band defining a helically seamed duct along the helical seam of which a special strip is incorporated. This strip is preferably tubular or hollow and is bonded to the helical-seam duct while being composed of a metallic material or of a synthetic resin coated on both sides with metal. The bonding of the helical strip to the band constituting the helical-seam duct may be effected by adhesive thermal bonding or the like. It will be apparent that temperature changes result in contraction or expansion of the inner shell and such expansion and contraction movement may be permitted within the outer cylindrical shell or envelope. The helical-seam construction of the intermediate shell permits the latter to be formed continuously over substantially the entire length of the conduit, successive lengths of the band being welded together if necessary. Alternatively, individual lengths of the helical-seam duct can be bonded together axially as may be required. According to another feature of this invention, the intermediate shell or duct is provided with means (e.g. suction pumps at spaced locations along the conduit line) for reducing the absolute pressure within this inner shell and around the fluid-carrying duct to an adjustable level between about $10^{-3}$ torr and 1 torr. The pressure differential is effective to the end that diffusion of the fluid medium from the fluid-carrying duct into the outer evacuated chamber is not permitted. This evacuated chamber is, therefore, economically maintained at absolute pressures of $10^{-5}$ torr and below, during cool-down and at operating temperatures of the duct system.

It has been found that the fluid-carrying duct, while usually free from leaks and seepage, may nevertheless have small leakage without disadvantageously affecting the overall improvement in the efficiency of the system and that even the intermediate shell surrounding the fluid-carrying duct may have small leaks or may be incompletely vacuum-tight because the low pressure differential across this duct (about $10^{-2}$ torr) does not permit significant quantities of gas to penetrate into the low-vacuum chamber and the vacuum therein prevents penetration into the high-vacuum chamber. Hence it is an important advantage of the invention that the fluid-carrying duct is separated from the high vacuum of the outermost insulating chamber. Additionally, the number of pumps required for maintaining the vacuum in the high-vacuum chamber is reduced and the difficulty hitherto encountered in maintaining a high vacuum in double-wall conduit systems is no longer experienced. Even the assembly of the system is facilitated since the inner tubes constitute a core about which the intermediate shell is formed and no frictional stress need be applied to the inner tube. The intermediate duct or shell, constituting a partition between the high-vacuum and low-vacuum chambers, can be drawn into the outer or high-vacuum shell, or the latter may be drawn over this duct so that only slight sliding friction is experienced and the fluid-carrying tubes maintained free from stress.

According to still another feature of this invention, the interior of the low-vacuum or intermediate shell is subdivided axially by a plurality of labyrinth seals into individual chamber sections each of which is connected with a respective suction pump, the labyrinth seals being formed by flexible partition disks in close-spaced relationship and close fitting into the intermediate or low-vacuum duct. The labyrinth seals are preferably of an elastically deformable synthetic resin of low sliding friction, most advantageously polytetrafluoroethylene such as is marketed under the name TEFLON; such disks retain their flexibility and their resilient deflectability even at the low temperatures at which the system of the present invention may operate.

The separation of the low-vacuum conduit by the labyrinth seals into a multiplicity of individual chamber sections, permits control of the heat exchange between the fluid-carrying ducts traversing these chambers. If one of the fluid-carrying ducts is a supply duct connected with a system to be cooled, e.g. a nuclear reactor or particle accelerator, while the other fluid-carrying duct returns the cooling fluid (in a slightly warmed state) to the cooling source, the heat exchange between the two fluid-carrying ducts is a function of the pressure in the respective chambers. I consequently provide control means, e.g. pressure-regulating valves or variable-displacement suction pumps, at each of these chambers for selectively varying the pressure therewithin and, concurrently, the heat exchange between the supply and return ducts. Such control has been found to be advantageous especially upon start-up of the conduit system to optimize the cooling of the conduit system.

According to still another feature of this invention, the tubular partition between the high-vacuum and the low-vacuum ducts, i.e. the intermediate duct, is provided along the helical reinforcing body described earlier, with pressure tubes traversed by a cooling medium which may be the same medium flowing through the fluid-carrying ducts. In this manner, the hollow body defined by the pressure ducts is constituted as a thermal shield preventing leakage of heat into the fluid-carrying ducts passing through this hollow body. The greatest portion of the thermal-energy impinging upon the intermediate duct, therefore, is intercepted by the coolant traversing the pressure ducts. The cooling of the hollow helical body, moreover, substantially reduces the time required to lower the temperature of the conduit system to any desired level.

I have also found it to be advantageous, upon introduction of the ducts for the cooling medium into the vacuum shell, to introduce a gas corresponding to the cooling medium into the fluid-carrying ducts to the extent that a slight overpressure is developed therein, thereby holding the fluid-carrying ducts in the shape required for the subsequent cooling operation. Upon the insertion of the intermediate shell into the outer shell it is convenient to introduce gas into the hollow helical reinforcing body of the intermediate shell for absorbing length variations during the later cool-down of the duct system such that the hollow reinforcing body is under pressure.

DESCRIPTION OF THE DRAWING

The above and other objects, features and advantages of the present invention will become more readily apparent from the following description, reference being made to the accompanying drawing in which:

FIG. 4 is a diagrammatic elevational view illustrating the assembly of the system.

SPECIFIC DESCRIPTION

Figure 1:
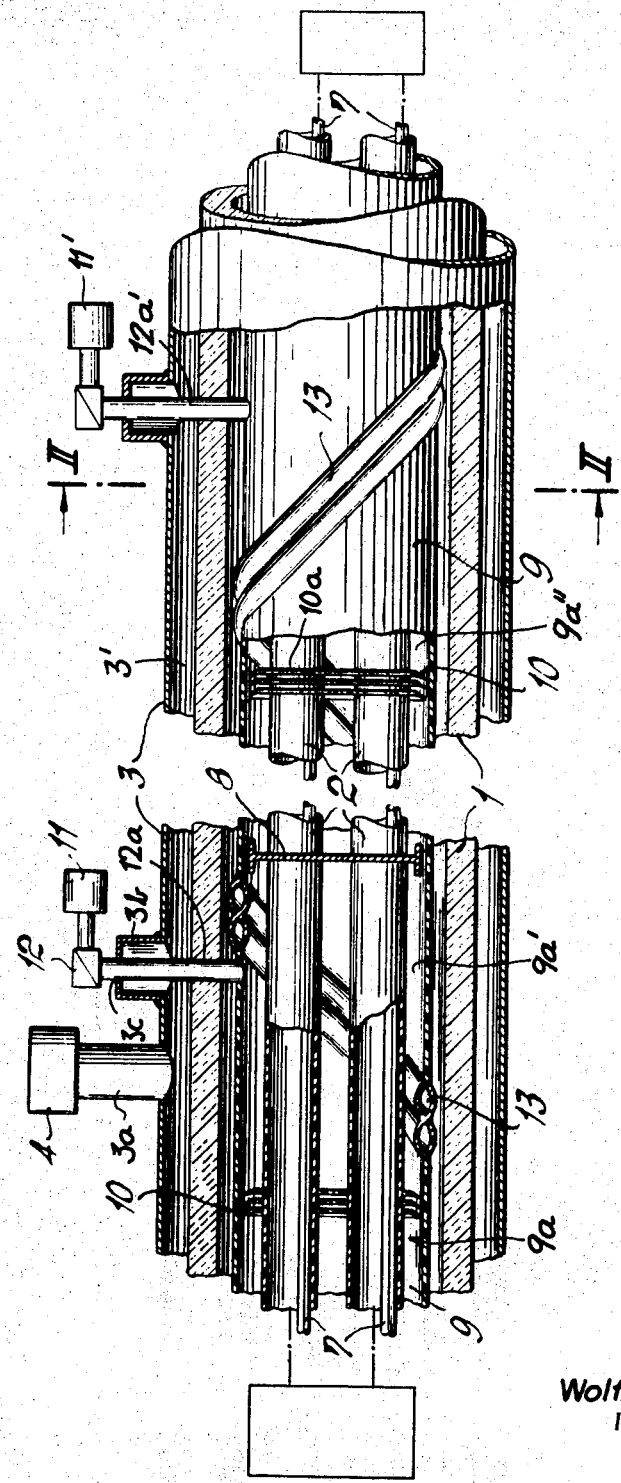
FIG. 1 is an axial cross-sectional view, partly in elevation and partly in diagrammatic form, of a conduit system embodying the invention.
Figure 2:
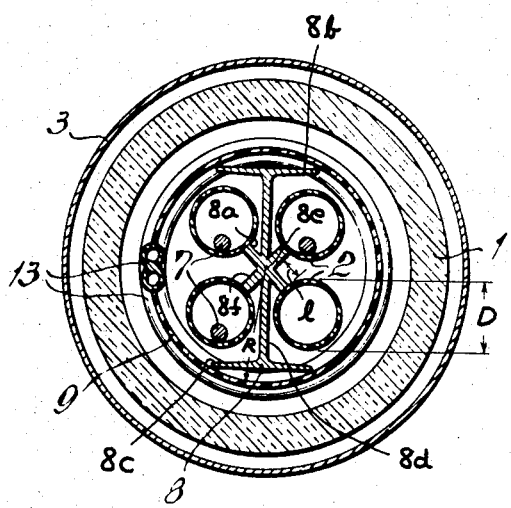
FIG. 2 is a cross-sectional view taken along the line II—II of FIG. 1.

As best shown in FIGS. 1 and 2, the conduit system of the present invention comprises an outer or vacuum shell 3 in the form of a cylindrical metallic duct whose interior 3' is subject to the high vacuum (below $10^{-5}$ torr) of a high-vacuum pump 4 connected to the duct 3 by a pipe 3a.

Coaxially disposed within the high-vacuum duct 3, is a cylindrical shell 1 of heat insulation forming a so-called radiation shield and composed of reflective but fluid-permeable material. The shield 1 may be composed of aluminized corrugated fiber sheets (see my application, Ser. No. 887,654) metallized glass-fiber mats or the like.

The radiation shield 1, in turn, coaxially surrounds an intermediate shell 9 defining within itself a low-vacuum chamber 9a at a pressure of about $10^{-3}$ torr to 1torr as described above. The intermediate duct or shell 9, moreover, may be metallized along its inner and outer surfaces to restrict radiative heat transfer thereacross and may be composed of a synthetic-resin material as will be apparent hereinafter.

Within the chamber 9a surrounded by the intermediate duct 9, there are provided a plurality of fluid-carrying ducts generally represented at 2, some of which receive electrical conductors 7 as best seen in FIGS. 1 and 2. The fluid-carrying ducts 2 may be used as shown in FIG. 1 to supply a cold fluid (e.g. super-cooled helium).

Figure 3:
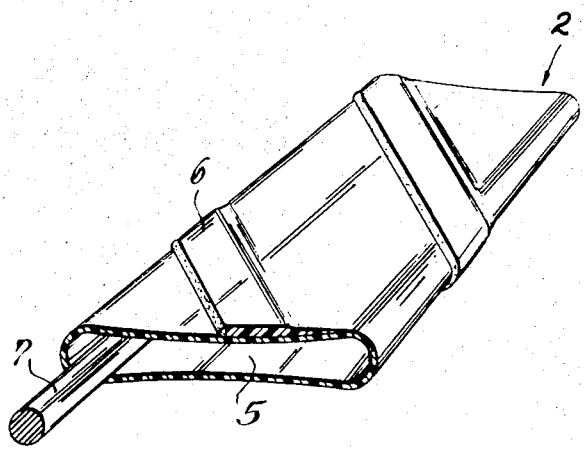
FIG. 3 is a detailed perspective view of a fluid-carrying conduit prior to its introduction into the inner or low-vacuum shell and FIG. 3A is a detail of FIG. 3.
Figure 3A:
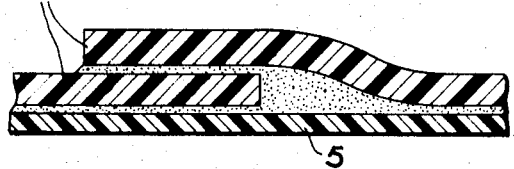

As best seen in FIG. 3 the fluid-carrying ducts 2 each may comprise an internally seamless tube 5 formed of a material which at room temperature has no appreciable stability of shape, i.e. polyethyleneterephthalate and if necessary reinforced by helically wound strips 6 of the same or a similar material, the latter strips may be heat-sealed along the outer periphery of the tube or bonded thereto by a two-component epoxy resin of the type previously described. The tube 5 may have a thickness of, say 0.1 mm to 1 mm. Consequently it is possible to flatten the tube 5 (FIG. 3) without elastic or permanent deformation thereof and coil the tube in the manner of a flattened fire hose, upon a drum such as that shown at 14 in FIG. 4. An electric conductor 7 can, of course, be present in the flattened tube upon the drum. The inner duct can be laminated from a plurality of layers, each having a thickness of about 0.1 mm and bonded together.

From FIGS. 1 and 2 it will also be apparent that the fluid-carrying ducts 2 are mounted upon or carry spacers 8 which are axially offset along the conduit by distance approximately equal to the axial width w of the synthetic-resin strip 16 from which the shell 9 is wound. The spacers 8 may be cemented at 8a, with the aforementioned two-component epoxy to the outer walls of the tubes 2 and are composed of electrically and thermally insulating material.

In the embodiment illustrated, each spacer 8 is generally in the form of an I-beam with upper and lower flanges 8b and 8c joined by a web 8d extending perpendicularly to these flanges along the axial vertical median flange of the conduit. Branching from the center 8e of this web, are a plurality of angularly equispaced arms 8f each of which has a length l slightly less than (R—D) where R is the radius of the inner surface of shell 9 and D is the outer diameter of the fluid-carrying duct 2.

In the embodiment illustrated, four tubes 2 are provided with centers at the vertices of a square along the diagonals of which lie the arms 8f.

The insulated electrical conductors 7 rest directly upon the insulating walls of the fluid-carrying tubes 2 and are directly surrounded by the cooling medium. The spacers 8 thus serve not only to support the intermediate shell 9, but also hold apart the conductor-carrying ducts 2 against the magnetic force tending to draw them together when the conductors are traversed by large-amplitude currents.

The intermediate duct 9 is axially subdivided by labyrinth seals 10 into a plurality of individual chambers 9a', 9a'', etc. as previously described. Each labyrinth seal 10 comprises a disk 10a of polytetrafluoroethylene (Teflon), the outer periphery of which is close fitted against the inner wall of the shell 9 while hugging the inner fluid-carrying ducts 2 which pass through openings formed in these disks.

Each of the chambers 99', 9a'' is connected via a pipe 12a, 12a' with a suction pump 11 or 11', the pipes 12a and 12a' passing through the insulating sheath 1 and the wall of the outer or high-vacuum shell 3. To permit some relative movement of the low-vacuum shell 9 and the high-vacuum shell 3, the seal around the pipe 12a or 12a' is formed by a sleeve 3b upstanding from the high-vacuum shell and affixed at 3c to the pipe. Between each pipe 12a or 12a' and the respective low-vacuum pump 11, is a valve 12 which permits control of the pressure within the chamber $9a'$ or $9a''$ at a level between $10^{-3}$ torr and 1 torr, the pressures in the successive chambers $9a'$, $9a''$ etc. being set at different magnitudes in accordance with the degree of heat transfer desired among the fluid-carrying ducts 2. In this manner, it is possible to alter the heat transfer in each chamber independently of the temperature to be maintained in the medium and to assure good compensation of the heat transfer to the other thermal characteristics of the system.

As is also apparent from FIGS. 1 and 2, the intermediate or low-vacuum shell 9 is formed with a helical duct 13 preferably by thermal welding along the helical seam, the duct 13 having two separate channels as best seen in FIG. 1, and constituting the hollow helical body surrounding the space $9a$ mentioned earlier. Each channel 13 may conduct cooling medium in one direction so that a circulation is established through the hollow body. Alternatively, the channel 13 may be connected with the cooling source of fluid-carrying ducts 2. By using the cooling of ducts 13, it is possible to precool the interior of the inner shell 9 by, for example, introducing a gas under pressure into one of the channels and expanding the gas through an expansion valve or throttle into the other channel in the return phase of the circulation.

In FIG. 4, I have shown the assembly of the conduit system in accordance with the present invention. As here illustrated, the flattened tubes 2, previously provided with conductors 7, are drawn from the drums 14 over direction-changing rollers 15 and led axially, whereupon the spacers 8 are mounted. As also is apparent from FIG. 4, the interior of each of the fluid-carrying ducts 2 is maintained at a slight superatmospheric pressure thereby inflating and expanding these ducts downstream of the rolls 15 to maintain the final positions of the fluid-carrying ducts 2 until the coolant stream is introduced. A helical-seamed shell 9 is then formed around this tube bundle by spinning the band-like foil 16 therearound, whereupon the channels 13, in the form of a seam strip 13, are fed to the helical seam and spun around the duct 9 and thermally welded in place. The tube 9 and the fluid-carrying ducts 2 are then drawn into the shell 3 and through the insulation layer 1 previously positioned therein.

The improvement described and illustrated is believed to admit of many modifications within the ability of persons skilled in the art, all such modifications being considered within the spirit and scope of the invention except as limited by the appended claims.

I claim:

1. A conduit system for conveying a cold medium in flowable form at low temperatures, comprising:
   at least one substantially continuous inner duct extending over the length of the conduit system;
   an intermediate shell spacedly surrounding said inner duct and defining a low-vacuum chamber therewith;
   an outer shell spacedly surrounding said intermediate shell and defining a high-vacuum space therewith, said duct being made of material which at room temperature has no appreciable stability of shape; and
   a plurality of spacers axially offset along said duct and interposed between said duct and said intermediate shell, said intermediate shell being formed with a generally helical hollow body extending along the length thereof, said intermediate shell being a helical-seal tube and said hollow body including at least one channel formed along the helical seal of said tube.

2. The system defined in claim 1 wherein the material of which the inner duct is made, is a polyethyleneterephthalate.

3. The system defined in claim 2 wherein said inner duct is a laminated duct from a plurality of layers each having a thickness of about 0.1 mm and being bonded together.

4. The system defined in claim 2 wherein a plurality of such ducts extends through said intermediate shell.

5. The system defined in claim 1, further comprising a plurality of labyrinth seals axially spaced along said duct and subdividing said chamber into a plurality of chamber sections, respective suction means connected with each of said sections for maintaining same at pressures between about $10^{-3}$ torr to 1 torr.

6. The system defined in claim 5 wherein each of said labyrinth seals comprises a plurality of polytetrafluoroethylene disks.

* * * * *